US008033313B2

(12) United States Patent
Hansen (10) Patent No.: US 8,033,313 B2
(45) Date of Patent: Oct. 11, 2011

(54) SIDE WINDOW ROLLER BLIND WITH INSERTION AID (75) Inventor: Melf Hansen, Gondelsheim (DE)

(73) Assignee: BOS GmbH & Co. KG, Ostfildern (DE)

( * ) Notice: Subject to any disclaimer, the term of this patent is extended or adjusted under 35 U.S.C. 154(b) by 309 days.

(21) Appl. No.: 12/233,165

(22) Filed: Sep. 18, 2008

(65) Prior Publication Data

US 2009/0078379 A1    Mar. 26, 2009

(30) Foreign Application Priority Data

Sep. 21, 2007    (DE) .......................... 10 2007 045 414

(51) Int. Cl.
B60J 3/00    (2006.01)

(52) U.S. Cl. .................. 160/370.22; 160/310; 160/265; 296/97.4; 296/97.8

(58) Field of Classification Search ............ 160/370.22, 160/265, 23.1, 26; 296/97.4, 97.8, 97.13, 296/141, 142, 143
See application file for complete search history.

(56) References Cited

U.S. PATENT DOCUMENTS

| 5,615,729 | A |   | 4/1997  | Matsumoto et al. |           |
|-----------|----|---|---------|------------------|-----------|
| 5,746,469 | A  | * | 5/1998  | Nonaka ........................ | 296/97.7  |
| 5,752,560 | A  |   | 5/1998  | Cherng           |           |
| 6,347,825 | B2 | * | 2/2002  | Seel et al. .................... | 296/97.8  |
| 6,422,291 | B1 |   | 7/2002  | Brunnert et al.  |           |
| 6,557,616 | B2 | * | 5/2003  | Schlect ..................... | 160/370.22|
| 7,717,158 | B2 | * | 5/2010  | Lekar et al. .............. | 160/370.22|
| 2001/0023746 | A1 |   | 9/2001 | Schlect        |           |
| 2001/0038224 | A1 | * | 11/2001 | Seel et al. .................... | 296/97.8 |
| 2008/0017335 | A1 |   | 1/2008 | Pohl et al.     |           |
| 2009/0078379 | A1 | * | 3/2009 | Hansen ........................ | 160/265  |

FOREIGN PATENT DOCUMENTS

| DE | 29913753 U1   | 12/1999 |
| DE | 19835257 A1   | 2/2000  |
| DE | 102004049059 A1 | 2/2005 |
| DE | 202004014652 U1 | 6/2006 |
| DE | 202006011248 U1 | 10/2006 |
| EP | 1136289 A2    | 9/2001  |
| EP | 1157870 A1    | 11/2001 |
| EP | 1336519 A1    | 8/2003  |

OTHER PUBLICATIONS

European Search Report, dated Dec. 16, 2009.

* cited by examiner

Primary Examiner — Blair M. Johnson
(74) Attorney, Agent, or Firm — Leydig, Voit & Mayer, Ltd.

(57) ABSTRACT

A side window roller blind is provided. The roller blind includes a support rod having a free end connected to a tension bar. In order to prevent rattling noises, the ends of the tension bar are provided with rollers that contact the window pane such that the support rod is elastically bent during extension of the blind. In addition, the window blind is provided with aligning aids that prevent the tension bar from hitting on the slot edges during retraction of the blind, and from blocking additional retraction, due to vibrations about the longitudinal axis of the tension bar.

27 Claims, 5 Drawing Sheets

Fig.5

# SIDE WINDOW ROLLER BLIND WITH INSERTION AID

CROSS-REFERENCE TO RELATED APPLICATIONS

This patent application claims the benefit of German Patent Application No. 102007045414.9, filed Sep. 21, 2007 which is incorporated herein by reference.

FIELD OF THE INVENTION

The present invention relates generally to roller blinds for windows of motor vehicles.

BACKGROUND OF THE INVENTION

Modern side window roller blinds for motor vehicles attempt to conceal the guide elements for guiding the blind whenever possible. This means that conventional guide rails that extend beside the rectangular part of the window need to be replaced with guide or support rods. As their name implies, the support rods support the tension bar arranged on the free edge of the blind when the blind is extended. This means that the support rods have two functions, namely guiding the tension bar such that it remains on the window and generating the required thrust for unwinding the blind from the winding shaft and maintaining the blind in the stretched state.

In this respect, the tension bar fixed to the free upper end of the support rod(s) should uniformly distribute the force exerted by the support rods over the blind such that it is held taut, without creases, in all areas. Any diagonal creases in the blind are perceived to be particularly unattractive. These creases can occur if the angle of the connection between the support rod and the tension bar is offset relative to the angle that the blind assumes due to its shape when it is unwound from the winding shaft.

A conical winding shaft can also raise problems with known arrangements. Until now, these winding shafts were only used in connection with manually actuated roller blinds. Other problems with side window roller blinds having support rods involve eliminating rattling noises and getting the tension bar to run properly into the extraction slot at the lower edge of the window.

OBJECTS AND SUMMARY OF THE INVENTION

In view of the foregoing, a general object of the present invention is to develop a side window roller blind that can be reliably retracted.

The side window roller blind for motor vehicles of the present invention is suitable for use on side windows having a window pane. The side window features a lower window edge and an upper window edge. An extraction slot is provided in the region of the lower window edge. One edge of the blind is fixed on the winding shaft that is rotatably supported underneath the extraction slot, and therefore in the door body.

The edge of the blind that is remote from the winding shaft is connected to a tension bar. This tension bar is supported by a single support rod, the upper end of which is connected to the tension bar such that the tension bar and the support rod are configured in a T-shaped manner. A guiding device for the support rod is provided within the door body and guides the support rod in a vertically displaceable fashion at a predetermined angle relative to the window edge.

An aligning aid is provided in order to ensure that the tension bar is correctly retracted into the extraction slot and closes off the extraction slot when the side window roller blind is retracted. The aligning aid, independently of the guiding device, moves the tension bar into a position in which the tension bar can be flawlessly retracted into the extraction slot.

As a result of the arrangement of the invention, the tension bar is prevented from catching. Therefore, the underside of the tension bar does not rest on the edges of the extraction slot, but rather seals the extraction slot and disappears therein. This skewing or catching is possible because the tension bar has significant play relative to the window pane at least in the lower portion of its movement path, i.e., in the vicinity of the lower window edge. Moreover, the guiding device inevitably can not be configured in a stable and rigid enough fashion to reliably preclude torsional movements about the longitudinal axis of the tension bar. Even slight skewing due to the elasticity of the tension bar may cause the tension bar to hit the slot edge with its outer ends and to overlap the slot, for example, by 1 mm, 2 mm or 3 mm. As a result, the tension bar sits unattractively on the edge of the extraction slot because the normally planar contact surfaces abut against one another. The aligning aid reliably prevents this catching regardless of the stability of the guiding device.

The aligning aid can be implemented in side window roller blinds that are actuated electrically, as well as in roller blinds that are actuated manually. With electrically actuated roller blinds, the support rod merely needs to be associated with a brake that needs to be overcome during the manual actuation.

The aligning aid may be provided on the tension bar and/or on the extraction slot. A suitable aligning aid on the extraction slot may be produced, for example, by slightly beveling the extraction slot appropriately in the vicinity of the ends of the retracted tension bar. This bevel is limited to the end region of the extraction slot so that the recess does not have an objectionable appearance.

The aligning aid may also be provided on the tension bar only, for example, in the form of an aligning extension that points from the lower edge of the tension bar in the direction of the lower window edge. The aligning extension is preferably configured in a wedge-shaped fashion.

It would also be possible to provide two aligning extensions that are arranged on either side of the support rod in order to control the skewing movement relative to the longitudinal axis of the extraction slot in both directions of rotation. The two aligning extensions may be limited to a short section relative to the length of the tension bar, or extend over the length of the tension bar to both sides of the support rod.

The guiding device for the support rod may feature a guide rail with a guide channel that continues with a constant cross section along the entire guide rail. In order to actuate the support rod, the support rod may be provided with an appendage that protrudes outward through the guide channel. The support rod can be moved at least in the extension direction by an associated linear actuating element.

With a manual side window roller blind, the winding shaft can be assigned a clock spring motor. In an electrically actuated side window roller blind, an electric geared motor is also provided for selectively moving the support rod upward and downward.

According to another aspect of the invention, it can be desirable to prevent rattling in a side window roller blind with one or more support rods when the blind is extended and the support rod is in its upper end position. In particular, unavoidable vehicle vibrations may cause at least the ends of the tension bar to strike against the window pane. Consequently, another objective of the invention is developing a side window roller blind that does not rattle.

A side window roller blind according to the invention that can meet that objective is suitable for use on side windows of motor vehicles in which a window pane is provided and the side window roller blind is bordered by a lower window edge. The lower window edge contains an extraction slot. A winding shaft is rotatably supported underneath this extraction slot. One edge of the blind is fixed on the winding shaft. The end of the blind that is remote from the winding shaft is connected to a tension bar.

The tension bar is moved with one or two support rods that carry and also guide the tension bar transverse to the window pane. The support rods are associated with guiding devices that are arranged in the door body underneath the lower window edge. The guiding devices are arranged such that the support rods are guided at a certain angle relative to the lower window edge, in a plane that forms an acute angle with the plane defined by the window pane. Due to this arrangement, the support rods come increasingly closer to the window pane during their extension movement. In combination with the flexibility of the support rods, this increasingly presses the tension bar fixed on the support rods against the window pane in the upper region of its movement path. If the input tension is greater than the vibrations occurring during normal driving, the tension bar remains in contact with the window pane.

The camber of the tension bar relative to the window pane is advantageous in electrically actuated and in manually actuated side window roller blinds.

A defined contact with the window pane is achieved if two contact elements are provided on the tension bar at a certain distance from one another. With respect to the material of construction, these contact elements may also be configured such that they do not produce any stress marks on the window surface even after long-term operation. Each contact element is preferably configured in the form of a rotatable roller. This results in a rolling motion that does not leave any stress marks.

The guiding device may be configured in the form of a guide rail with a guide channel that continues with a constant cross section along the entire guide rail. In order to operate the support rod, an arm or appendage may be provided that extends outward through the guide channel, wherein a driving element engages on the arm or appendage.

A clock spring motor may be advantageously assigned to the winding shaft, regardless of a manual or electrical actuation of the roller blind.

In a manual side window roller blind, a brake can be assigned to the guiding device in order to hold the support rod in the extended position. In an electrically actuated side window roller blind, an electric geared motor is provided that cooperates with the support rod(s).

Aspects for understanding the invention are discussed in the following description of preferred embodiments. A person skilled in the art can readily ascertain other details, not specifically described, from the description and the accompanying figures. A number of modifications are, of course, possible.

The figures are not necessarily true-to-scale. For example, certain regions may be enlarged in order to illustrate certain details. In addition, the figures are very simplified and do not contain every detail that may be provided in a commercial embodiment. As used herein, the terms "top" and "bottom" or "front" and "rear" refer to the normal installation in motor vehicles.

Other objects and advantages of the invention will become apparent upon reading the following detailed description and upon reference to the drawings, in which:

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DESCRIPTION OF THE PREFERRED EMBODIMENTS

Figure 1:
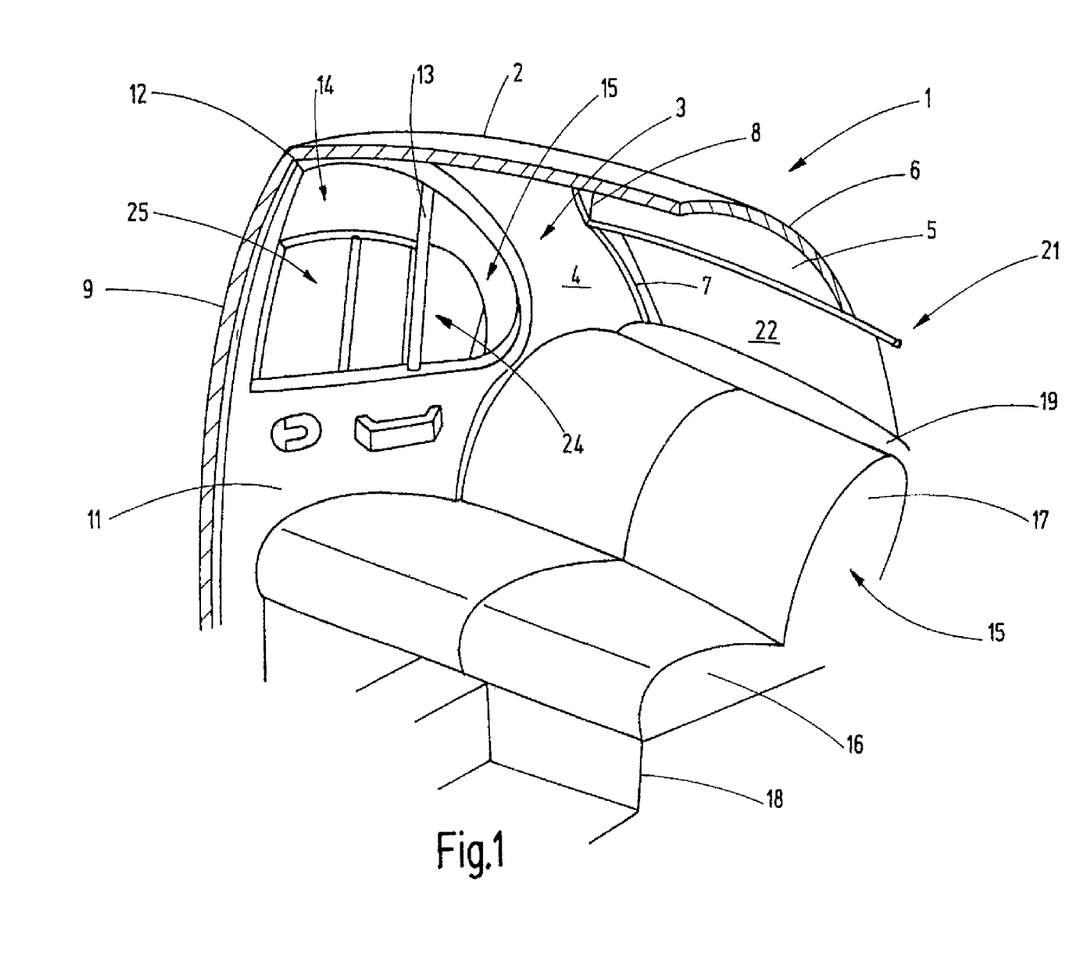
FIG. 1 is a partially cut away schematic perspective view of an exemplary rear passenger area of a motor vehicle.

Referring to FIG. 1 of the drawings, the passenger area of an exemplary motor vehicle is shown. The right side of the passenger area is shown in FIG. 1 and it is a mirror image of the left inner side. If not indicated otherwise, the explanations concerning the right side of the car body also apply to the left side of the car body. FIG. 1 is simplified in that, for example, interior car body structures such as reinforcements and mounting elements are not shown because they are not necessary for understanding the invention.

The illustrated car body section 1 includes a roof 2, from which a C-column 3 extends downward to a floor pan. A corresponding C-column is provided on the other side of the vehicle. The inner side of the C-column 3 is provided with a lining 4. The rear edge of the roof 2 transitions into a rear window 5 that is bordered on the upper side by an upper window edge 6. Only a section 7 of the lateral edges of the rear window can be seen in FIG. 1. The illustrated section of the lateral edge of the rear window transitions into the upper window edge 6 at a corner region 8. The width of the rear window 5 is greater at the height of the waistline of the car body than in the area of the upper window edge 6.

A B-column 9 is provided a certain distance in front of the C-column 3. A right rear side door 11 is conventionally hinged to the B-column 9. The right rear side door 11 contains a window cutout 12 that is divided into a substantially quadrangular section 14 and an approximately triangular section 15 by a vertical brace 13.

The car interior also includes a rear bench seat 15 with a rear seat surface 16 and a rear backrest 17. The rear seat surface 16 sits on a floor pan undercarriage 18. A rear shelf 19 extends between the rear upper edge of the rear backrest 17 and the rear window 5.

The rear window 5 is provided with a rear window roller blind 21, of which only the blind 22 portion is illustrated in FIG. 1. Other window blinds are situated on the side window 12. Specifically, a blind 25 is provided in a quadrangular window section 14 and a blind 24 is provided in a triangular section 15.

Figure 2:
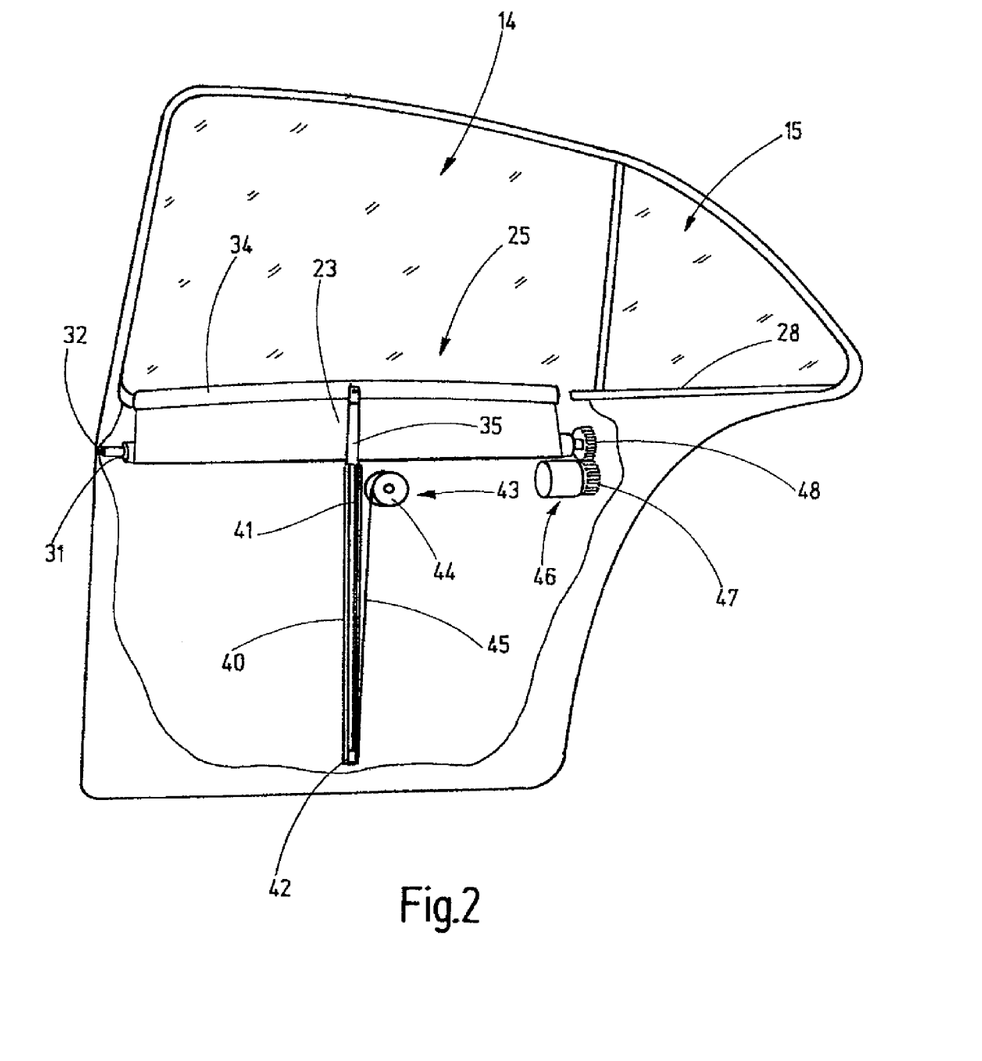
FIG. 2 is a partially cut away schematic side view of the right rear side door of the vehicle of FIG. 1 showing a window roller blind according to the invention.

FIG. 2 provides an enlarged view of the side door of the motor vehicle. The interior lining of the door is cut away in FIG. 2 in order to show the design of the side window roller blind 25. As shown in FIG. 2, the lower edge of the window cutout is bordered by a lower window edge 28 with a slot, through which the window blind 25 can be extended from the body of the side door 11. The window roller blind 25 features a blind 29, one edge of which is fixed on a winding shaft 31. The winding shaft 31 is rotatably supported in the body of the door underneath the lower window edge 28 with the aid of bearing pins 32 and 33. The bearing blocks for supporting the winding shaft are not shown in order to provide a better overview of the design.

The blind 29 comprises a substantially inelastic material that is suitable for producing a sufficient shading effect. The shape of the blind 29 approximately corresponds to the size of the window cutout 14. The blind 29 is provided with a tension bar 34 on the free edge.

A support rod 35 is provided as a guiding device for guiding the tension bar 34 between a retracted position that is illustrated in FIG. 2 and the extended position. The support rod 35 consists of a straight bar that can carry and move the tension bar 34 in a sufficiently buckle-proof fashion. The upper end of the support rod 35 is connected to the tension bar 34 in a tension- and compression-resistant manner.

The support rod 35 moves in a guide rail 40 that is supported in the door body and does not protrude beyond the lower window edge 28. The guide rail 40 serves to guide a sliding displacement of the support rod 35 approximately perpendicular to the lower window edge 28. The length of the support rod 35 can be determined from the following functional description. The guide rail 40 does not necessarily have to extend straight over the entire length within the door body; it may be curved, for example, about an axis extending parallel to the vehicle axis in order to follow the contour of the door.

The guide rail 40 contains a guide channel that opens outwards with respect to FIG. 1 in the form of a continuous channel slot 41. The cross section of the channel chamber situated behind the channel slot 41 is adapted to the cross section of the support rod 35.

The lower end of the support rod 35 is connected to a tongue 42 that protrudes outward through the slot 41. The support rod 35 is biased toward the extended position by its own clock spring motor 43. The clock spring motor 43 is situated slightly underneath the lower window edge 28. In the illustrated embodiment, the clock spring motor is underneath the winding shaft 31. The clock spring motor 43 features a rotatably supported clock spring housing 44 in which a clock spring configured similarly to a coil spring is arranged. The clock spring housing can rotate, but the inner spring end is anchored in a rotationally fixed fashion. The clock spring housing 44 has a cylindrical outer circumferential surface. One end of a tension band 45 in the form of a textile band is fixed on this surface. The other end of the band 45 is connected to the tongue 42.

The side window roller blind 25 also features a geared motor arrangement 46 that via an output gearwheel 47 drives a gearwheel 48 which is arranged coaxial with the winding shaft 31 and is rotationally fixed to it.

The operation of the side window roller blind 25 is as follows. In the retracted state, the blind 29 is wound up on the winding shaft 31 until the upper side or upper edge of the tension bar 34 is approximately flush with the lower window edge 28. In this position, the support rod 35 has reached its maximum retraction depth. This means that the tension band 45 is unwound as far as possible from the clock spring motor 43.

The self-locking effect of the geared motor 47 prevents the clock spring motor 43 from unwinding the blind 29 from the winding shaft 31. The side window roller blind 25 remains in the retracted position shown as long as the motor 47 is switched off.

The geared motor 47 is actuated accordingly when the user wants to extend the side window roller blind 25. This causes the winding shaft 31 to rotate in the unwinding direction of the blind 29. The clock spring motor 43 pushes the tension bar 34 upward via the support rod 35 as the blind 29 is unwound from the winding shaft 31. This effect is achieved because the clock spring motor 43 has the tendency to lift or displace the lower end of the support rod 35 upward in the direction of the lower window edge 28 via the tension band 45.

Once the blind 29 is completely extended, i.e., once the tension bar 34 has arrived at the upper window edge, the geared motor 47 is deactivated. This prevents the clock spring motor 43 from pushing the support rod 35 further upward because the inelastic blind 29 prevents further movement of the blind 29 due to the braked winding shaft 31.

In the upper position, the tension band 45 is wound up as far as possible on the clock spring motor housing 44 of the clock spring motor 43. In order to maintain the tension in the tension band 45 in the uppermost position, the lower end of the support rod 35 needs to stop an appropriate distance below the clock spring motor 43.

The geared motor 47 is actuated in the opposite rotational direction in order to retract the side window roller blind 25. This causes the winding shaft 31 to turn in the wind-up direction of the blind 29. Since the blind 29 is inelastic, the corresponding forces are transmitted to the tension bar 34 and from there to the support rod 35 that is forced to increasingly retract into the guide rails 40. During the downward movement, the tension band 45 is correspondingly unwound from the clock spring motor 43. The generation of the bias within the clock spring motor 43 will be understood by a person skilled in the art. The utilization of a tension band provides the advantage of winding up the layers on top of one another in an orderly fashion.

Figure 3:
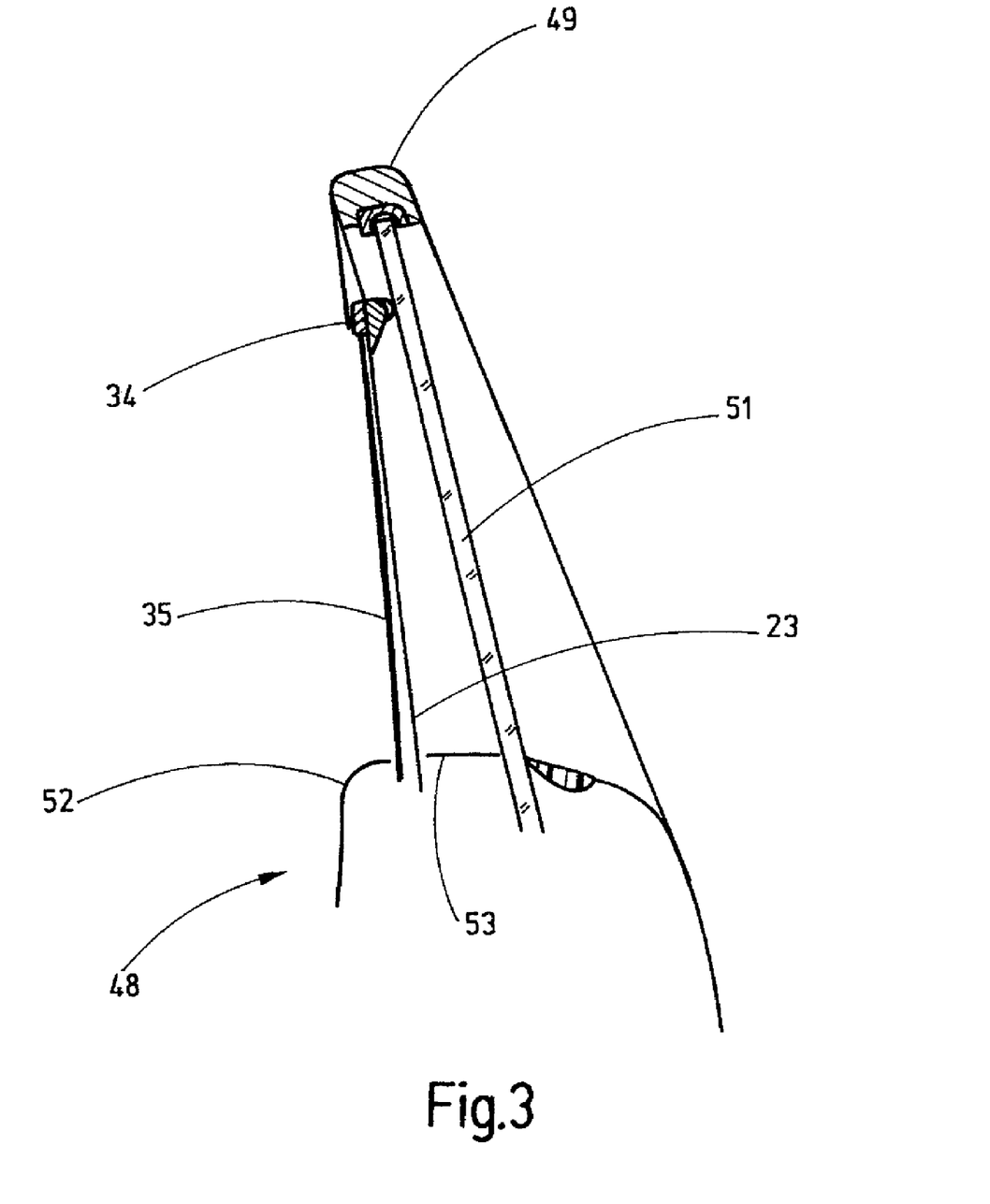
FIG. 3 partially cut away side view of the side door of the vehicle showing the connection between the support rod and the tension bar of the roller blind of FIG. 2.

FIG. 3 is a highly schematic cross-section through the vehicle door, wherein the plane of section lies parallel to the transverse axis of the vehicle. An upper part of a door body 48 is shown in FIG. 3 above which a window frame 49 is arranged. A window pane 51 of the side window 14 is displaceably guided within the window frame. The door body 48 also comprises an interior trim 52 that contains an extraction slot 53 at the upper edge. The extraction slot extends parallel to the window pane 51 and is spaced apart from it. The blind 23 and the support rod 35, both of which are illustrated in the extended position, extend through the extraction slot 53. The tension bar 34 is illustrated at the upper end of the support rod 35.

The arrangement is such that the support rod is theoretically moved upward in the region of the extraction slot 53 in a plane that forms an acute angle with the plane defined by the window pane 51 at the upper end of the side window 14. Due to this, the tension bar 35 is spaced apart from the inner side of the window pane 51 when it lies in the extraction slot 53. However, when the side window roller blind 25 is extended, the tension bar 34 is increasingly displaced toward the inner side of the window pane 51. Contact between the inner side of the window pane 51 and the support rod 34 over parts thereof occurs approximately in the upper third of the window pane 51. During the continued extension movement of the blind 23, the tension bar 35 is elastically displaced toward the vehicle interior as shown. It is slightly curved while the blind 23 extends exactly straight. The requisite bending force for the support rod 35 generates a pressing force that presses the tension bar 34 against the window pane 51. The force is selected such that vibrations occurring while driving cannot lift the tension bar 34 off the inner side of the window pane 51 and cause rattling noises.

As shown in FIG. 3, the tension bar 34 loses contact with the window pane 51 during retraction after approximately one-third of the retraction movement. In the lower region, the space between the inner side of the window pane 51 and the tension bar 34 is actually relatively large. The inevitably occurring vibrations may cause the tension bar 34 to vibrate about the longitudinal axis of the support rod 35. Due to these vibrations, the outer ends of the tension bar 34 may hit the edges of the extraction slot 53. This can block additional retraction. As a result, the tension bar 34 remains on the upper side of the interior trim 52 instead of entering into the extraction slot 53 as intended and producing a flush surface that completes the profile of the interior trim in the region of the extraction slot 53.

Figure 4:
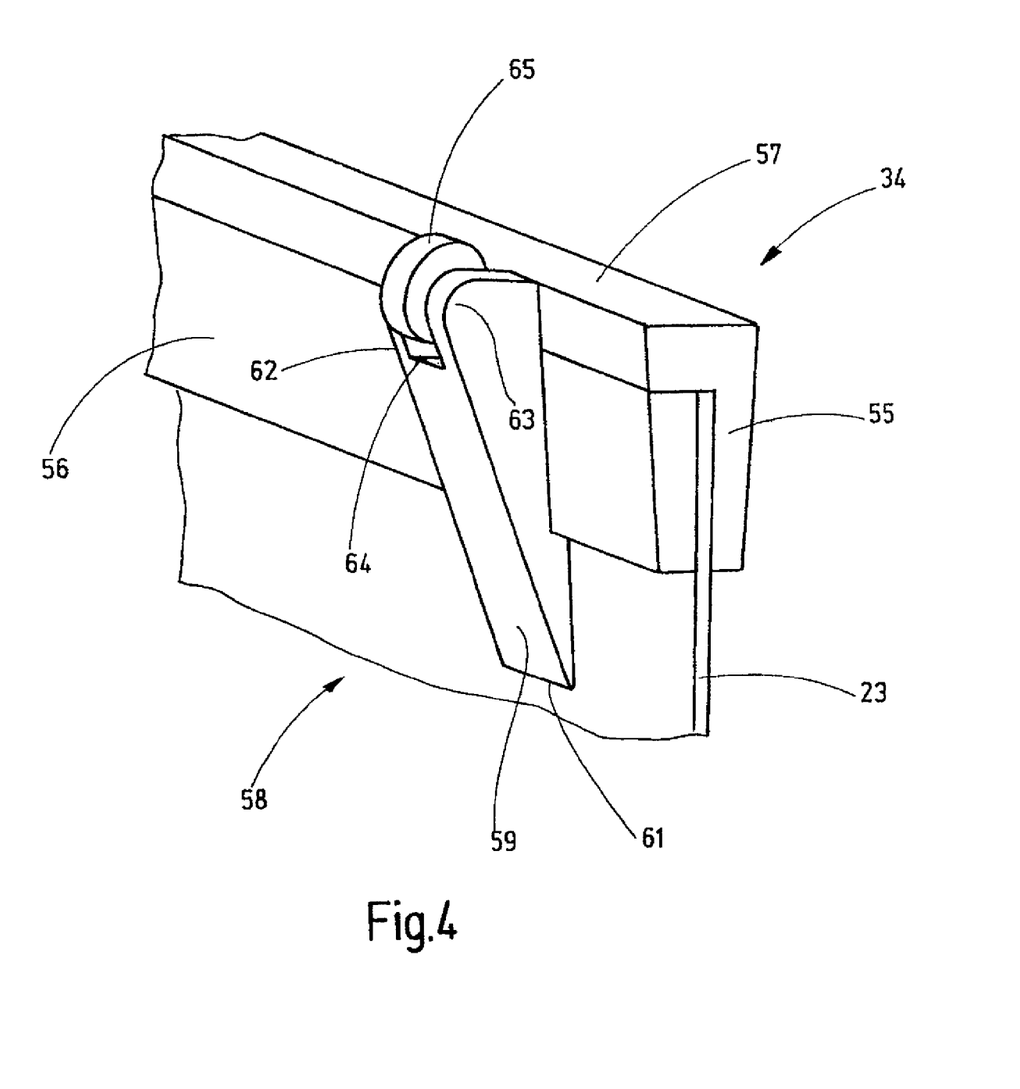
FIG. 4 is a perspective view showing the clock spring motor of the roller blind of FIG. 2.

According to FIG. 3 and the corresponding description, a contacting movement takes place along the inner side of the window pane 51. FIG. 4 shows an end section of the tension bar 34 that makes it possible to control the pendulum-type vibrations of the tension bar about the longitudinal axis of the support rod 35, as well as the contact between the tension bar 34 and the window pane 51.

As shown in FIG. 4, the tension bar 34 features an L-shaped inside profile 55 that extends over the entire length of the upper edge of the blind 23. The blind 23 is seated in the inside corner formed by the L-shaped profile 55. Another bar 56 completely fills out the inner corner of the L-shaped profile 55 as shown, and presses the blind 23 against the corresponding side of the L-shaped profile 55. The bar 56 is spot-welded to the long limb of the L-shaped profile 55, for example, by means of ultrasonic welding, such that the blind 23 is correspondingly clamped in position. The L-shaped profile 55 forms an upper side 57 that closes off the extraction slot 53 when the blind is completely retracted such that the upper side 57 continues the profile of the interior trim 52 in a flush and smooth fashion.

An insertion aid 58 in the form of a wedge-shaped element with a wedge surface 59 is situated in the vicinity of the illustrated end of the tension bar 34. The insertion element 58 is injection-molded of an appropriate thermoplastic, for example, integrally with the bar or strip 56. The wedge surface 59 points toward the window pane 51 and begins on the surface of the blind 23 a certain distance from the lower edge of the strip 56. The height of the region of the insertion element that covers the blind 23 is approximately 10 mm to 15 mm. Consequently, an edge 61 is created that lies directly on the blind 23. Beginning at the edge 61, the wedge surface 59 extends away from the plane defined by the blind 23 in the direction toward the upper side 57 at a constant angle of approximately 5° to 20°. Measured parallel to the longitudinal direction of the tension bar 34, the wedge surface 59 has a width of approximately 5 mm to 15 mm. Another wedge surface 59 is provided on another aligning aid 58 that is correspondingly arranged on the other end of the tension bar 34 and requires no detailed description.

In the region of its upper end, at which it has a significant thickness measured perpendicular to the window pane 51, the insertion aid 58 is slotted and forms two parallel limbs 62 and 63 that define a slot 64. A contact element in the form of a small roller 65 is rotatably supported in the slot 64. The not-shown aligning element 58 on the other end of the tension bar 34 is analogously provided with a roller 65. During the extension of the window roller blind 25, the tension bar 34 approaches the window pane 51, and the tension rod 34 comes into contact with the window pane 51 at two points that lie near the ends and are realized in the form of the rotatable rollers 65. During the continued extension movement, the rollers 65 roll along the window pane 51 and prevent stress cracks from being created in the window pane over the course of time. Moreover, a defined contact that is limited to the ends of the tension bar 34 is simultaneously produced. The same rolling motion analogously occurs during retraction until contact with the window pane 51 is lost.

As soon as the tension bar 34 approaches the extraction slot 53 during retraction, the two wedge surfaces 59 force the tension bar 34 into a position, in which it is aligned with the opening of the extraction slot 53, regardless of the size of the deflection movement. Since the wedge surfaces 59 are extended downward beyond the underside of the tension bar 34, the underside of the tension bar 34 cannot hit the edges of the slot 53 and remain lying thereon.

Since two aligning elements 58 are provided at the two ends of the tension bar 34 and both aligning elements force the tension bar in the same direction, one aligning element prevents a rotational movement in one direction about the longitudinal axis of the support rod 35 and the other aligning element prevents a rotational movement in the opposite direction.

Figure 5:
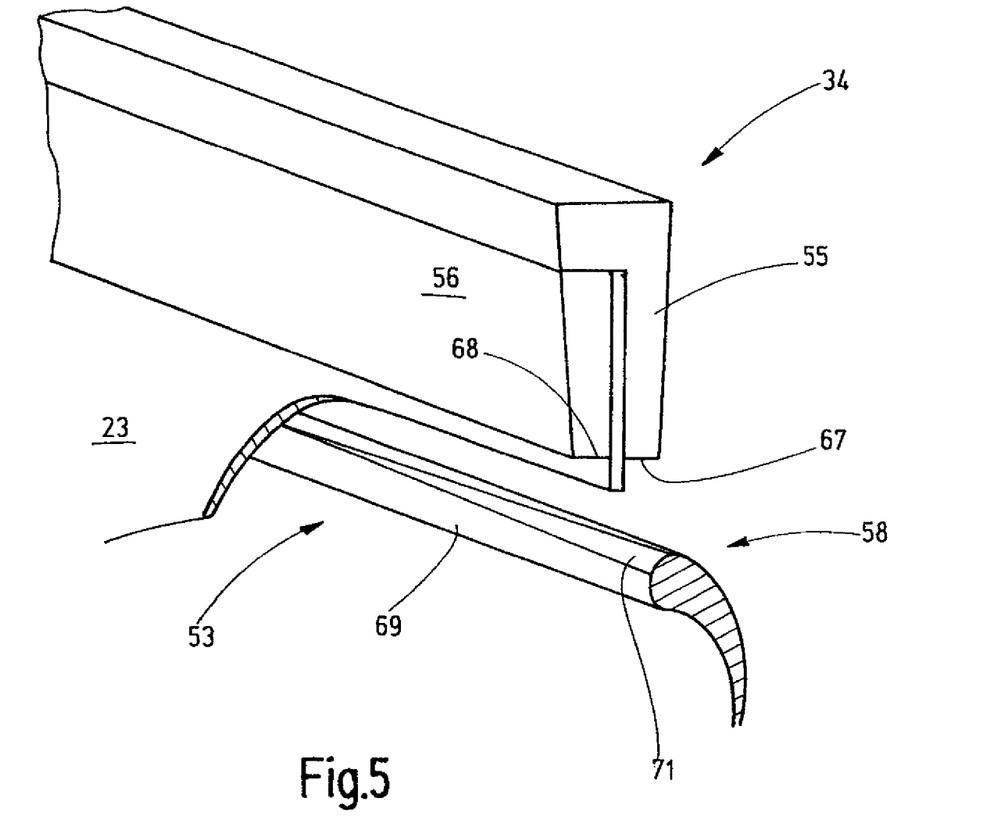
FIG. 5 is schematic perspective view of an alternative embodiment of a window roller blind of the present invention having a beveled extraction slot edge.

FIG. 5 shows an alternative embodiment of the aligning aid 58. The tension bar 34 once again consists of two strips 55 and 56, between which the blind 23 is clamped. Both bars 55 and 56 end at the same height on narrow edges 67 and 68 that approximately lie at the same level and are aligned approximately perpendicular relative to the blind 23.

The aligning aid 58 consists, for example, of a bevel on the far edge 69 of the extraction slot 53 relative to the window 51. The bevel forms an inclined surface 71 that is tapered in the direction of the support rod 35 in the form of a triangular surface and widens in the direction toward the respective end of the extraction slot 53. The inclined surface 71 therefore consists of a triangular surface that is inclined twice relative to the plane defined by the blind 23 as illustrated in FIG. 4. The aligning aid 58 is essentially limited to the ends of the extraction slot 53 and therefore only cooperates with the ends of the tension bar 34.

At small alignment errors, the roundings that are already present on the tension bar 34 as well as on the slot edge 69 of the extraction slot 53 force the tension bar 34 into the correct position. The undesired jamming only occurs at significant offsets that would result in an overlap on the order of 2 mm to 3 mm, for example, between the lower side 67 and the slot edge 69. The inclined surfaces 71 become effective in such instances and prevent a butting overlap and generate a torque that forces the tension bar 34 into the aligned position. They act like a segment of a screw surface. The length of the inclined surface is defined by the other basic conditions and can be easily determined empirically.

A side window roller blind is provided with a support rod, the free end of which is connected to a tension bar. In order to prevent rattling noises, the ends of the tension bar are provided with rollers that contact the window pane such that the support rod is elastically bent during the extension. In addition, the window blind is provided with aligning aides that prevent the tension bar from hitting the slot edges during retraction and from blocking the additional retraction due to vibrations about the longitudinal axis of the tension bar.

The invention claimed is:

1. A side window roller blind for a motor vehicle having a side window that has a lower window edge and an upper window edge, wherein an extraction slot is provided at the lower window edge, the side window roller blind comprising:
a winding shaft that is rotatably supportable underneath the extraction slot;
a blind that is cut to a shape corresponding to that of the side window, the blind having a first edge fixed on the winding shaft and a second edge remote from the winding shaft;
a tension bar that is fixed on the second edge of the blind for movement between blind extended and retracted positions, said tension bar having rollers for rolling contact with said window during movement of said blind between said extended and retracted positions;
a single support rod that has an upper end connected to the tension bar and a lower end;
a guiding device for the support rod arrangeable underneath the lower window edge for vertically guiding movement of the support rod in a direction approximately perpendicular to the lower window edge; and
said tension bar having an aligning aid configured such that the vertical retraction movement of the blind causes the tension bar to be aligned into a position in which it is oriented substantially parallel to the extraction slot, said alignment aid defining a guide surface having a portion extending along and substantially less than the length of the tension bar on a side of the blind adapted to face the window angled away from a plane of the blind in an upward direction toward the window for engaging an edge of the extraction slot and guiding the tension bar into pre-determined retracted position relative to the extraction slot.

2. The side window roller blind according to claim 1, wherein the aligning aid is provided only on the tension bar.

3. The side window roller blind according to claim 1, wherein the aligning aid comprises first and second parts.

4. The side window roller blind according to claim 1, wherein the aligning aid comprises an aligning extension arranged on the underside of the tension bar and is tapered toward the blind.

5. The side window roller blind according to claim 4, wherein the aligning extension has a wedge-shaped configuration with a lower wedge tip adjacent the blind.

6. The side window roller blind according to claim 1, wherein the guiding device for the support rod includes a guide rail that contains a guide channel that has a constant cross section along the entire guide rail.

7. The side window roller blind according to claim 6, wherein the support rod includes an appendage that protrudes outward from the guide channel.

8. The side window roller blind according to claim 1 including a motor for moving the support rod in a blind extending direction.

9. The side window roller blind according to claim 8, wherein the motor is operable for moving the winding shaft.

10. The side window roller blind according to claim 8, wherein the motor comprises a clock spring motor that is coupled to the support rod.

11. The side window roller blind according to claim 9, wherein the motor is a geared motor.

12. The side window roller blind according to claim 1, wherein the guiding device guides the tension bar in a direction approximately perpendicular to the lower window edge.

13. The side window roller blind according to claim 1 in which said alignment aid is wedge shaped with a lower tip thereof adjacent the blind.

14. The side window roller blind according to claim 1 in which a lower edge of the alignment surface is adjacent the plane of the blind facing the window and an upper edge of the alignment surface is in a plane outwardly of the plane of the blind.

15. The side window roller blind according to claim 1 in which said rollers are mounted on said alignment aid.

16. The side window roller blind according to claim 1 including a pair of said alignment aids at opposite ends of said tension bar.

17. The side window roller blind according to claim 16 in which each said alignment aids each carry respective one of said rollers for engaging the window during movement of the blind and tension bar between protracted and extended positions.

18. The side window roller blind according to claim 1 in which said rollers have axes of rotation disposed in fixed relation to said tension bar.

19. A side window roller blind for a motor vehicles having a side window including a window pane, the side window having a lower window edge and an upper window edge with an extraction slot being provided at the lower window edge, the side window roller blind comprising:
a winding shaft rotatably supportable underneath the extraction slot;
a blind that is cut to a shape corresponding to that of the side window, the blind having a first end fixed on the winding shaft and a second edge remote from the winding shaft;
a tension bar that is fixed on the second edge of the blind for movement between blind extended and retracted positions, the tension bar including a contact element for contacting the window pane, said tension bar having rollers for rolling contact with said window during movement of said blind between said extended and retracted positions;
a flexible support rod that has an upper end connected to the tension bar and a lower end;
a guiding device for the support rod that is arrangeable underneath the lower window edge for vertically guiding movement of the support rod in a direction approximately perpendicular to the lower window edge, and in a plane that forms an acute angle with a plane defined by the window pane, such that the contact element of the tension bar comes into contact with the window pane at least in an upper position; and
said tension bar having an aligning aid configured such that the vertical retraction movement of the blind causes the tension bar to be aligned into a position in which it is oriented substantially parallel to the extraction slot, said alignment aid defining a guide surface having a portion extending along and substantially less than the length of the tension bar on a side of the blind adapted to face the window angled away from a plane of the blind in a direction toward the window and an upper end of the tension bar for engaging an edge of the extraction slot and guiding the tension bar into pre-determined retracted position relative to the extraction slot.

20. The side window roller blind according to claim 19, wherein the tension bar includes two contact elements that are spaced from each other.

21. The side window roller blind according to claim 19, wherein the contact element comprises a rotatably supported roller.

22. The side window roller blind according to claim 19, wherein the guiding device for the support rod includes a guide rail with a guide channel that has a constant cross section along the entire guide rail.

23. The side window roller blind according to claim 22, wherein the support rod includes an appendage that protrudes outward from the guide channel.

24. The side window roller blind according to claim 19 including a motor for moving the support rod in a blind extending direction.

25. The side window roller blind according to claim 24, wherein the motor is operable for moving the winding shaft.

26. The side window roller blind according to claim 24, wherein the motor comprises a clock spring motor that is coupled to the support rod.

27. The side window roller blind according to claim 25, wherein the motor is a geared motor.

* * * * *